United States Patent
Oshima

(10) Patent No.: US 10,600,531 B2
(45) Date of Patent: *Mar. 24, 2020

(54) HIGHLY BENDABLE INSULATED ELECTRIC WIRE

(71) Applicant: Yazaki Corporation, Tokyo (JP)

(72) Inventor: Takeshi Oshima, Shizuoka (JP)

(73) Assignee: YAZAKI CORPORATION, Minato-ku, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/031,377

(22) Filed: Jul. 10, 2018

(65) Prior Publication Data

US 2019/0027273 A1 Jan. 24, 2019

(30) Foreign Application Priority Data

Jul. 20, 2017 (JP) ................. 2017-140607

(51) Int. Cl.
| | | |
|---|---|---|
| *H01B 5/08* | (2006.01) | |
| *H01B 7/04* | (2006.01) | |
| *H01B 3/44* | (2006.01) | |
| *B60R 16/02* | (2006.01) | |
| *H01B 7/00* | (2006.01) | |
| *H01B 13/02* | (2006.01) | |

(52) U.S. Cl.
CPC ......... *H01B 7/04* (2013.01); *B60R 16/0207* (2013.01); *H01B 3/443* (2013.01); *H01B 7/0009* (2013.01); *H01B 7/0045* (2013.01); *H01B 13/02* (2013.01)

(58) Field of Classification Search
CPC ....................................................... H01B 5/08
USPC .......................................... 174/128.1, 128.2
See application file for complete search history.

(56) References Cited

U.S. PATENT DOCUMENTS

| | | | | |
|---|---|---|---|---|
| 2003/0037957 | A1* | 2/2003 | Ueno ................. | H01B 5/08 174/128.1 |
| 2011/0005805 | A1 | 1/2011 | Eshima | |
| 2011/0079427 | A1* | 4/2011 | Powale ............. | H01B 3/427 174/72 A |
| 2013/0233596 | A1* | 9/2013 | Ishibashi ........... | H01B 7/0009 174/128.1 |

FOREIGN PATENT DOCUMENTS

| | | | |
|---|---|---|---|
| CN | 106633486 | * | 5/2017 |
| JP | 2005-197135 A | | 7/2005 |
| JP | 2011-018545 A1 | | 1/2011 |
| JP | 2011-126980 A | | 6/2011 |

* cited by examiner

*Primary Examiner* — Chau N Nguyen
(74) *Attorney, Agent, or Firm* — Sughrue Mion, PLLC

(57) ABSTRACT

A highly bendable insulated electric wire including: a conducting wire formed by stranding a plurality of metal strands; and an insulator covering the conducting wire, in which a twist pitch ratio of the conducting wire (a twist pitch/an outer diameter of the conducting wire) is 10.8 or less, the insulator is made of a resin composition containing a vinyl chloride resin and having an elongation rate of 130% or higher at −40° C., and an adhesion strength between the conducting wire and the insulator is 20 N or less.

3 Claims, 2 Drawing Sheets

HIGHLY BENDABLE INSULATED ELECTRIC WIRE

CROSS-REFERENCE TO RELATED APPLICATIONS

This application is based upon and claims the benefit of priority from the prior Japanese Patent Application No. 2017-140607, filed on Jul. 20, 2017, the entire contents of which are incorporated herein by reference.

BACKGROUND OF THE INVENTION

1. Field of the Invention

The present invention relates to a highly bendable insulated electric wire. In particular, the present invention relates to a highly bendable insulated electric wire used as an electric wire to be routed in a vehicle such as an automobile.

2. Description of the Related Art

An electric wire such as a wire harness for a vehicle such as an automobile is sometimes routed to be greatly bent within a short path. Thus, such an electric wire is required to have high flexibility. Further, recently, there has been a demand for a high-flexible electric wire capable of coping with a wide range of temperature along with an increase of components and high performance of automobiles. However, it is difficult to improve the flexibility of such a high-flexible electric wire while suppressing the cost.

Examples of methods for improving the flexibility of the electric wire include a known method of reducing a diameter of a conductor strand and providing a double-stranded structure as a method that places a focus on a conductor portion (for example, see JP 2005-197135 A). In addition, as a method that places a focus on an insulator portion, there is known a method of providing an insulating portion using a coating material excellent in cold resistance and the like (for example, see JP 2011-126980 A). In addition, there is known a method of inserting an intervening material between strands to reduce abrasion between the strands (for example, see JP 2011-18545 A).

BRIEF SUMMARY OF THE INVENTION

However, in the method disclosed in JP 2005-197135 A, management is difficult because the number of strands is increased while the diameter is reduced to obtain the double-stranded structure, which causes an increase in cost. In addition, the method disclosed in JP 2011-126980 A is a finding concerning the insulator portion excellent in cold resistance, but the conductor portion and the flexibility at normal temperature is not taken into consideration. Furthermore, in the method disclosed in JP 2011-18545 A, a manufacturing step increases due to the insertion of the intervening material between the strands, which causes an increase in cost.

The present invention has been made in view of such problems included in the related art. An object of the present invention is to provide a highly bendable insulated electric wire that is excellent in flexibility under environment of both normal temperature and low temperature and has a simple configuration.

A highly bendable insulated electric wire according to a first aspect of the present invention includes a conducting wire formed by stranding a plurality of metal strands and an insulator covering the conducting wire.

A twist pitch ratio of the conducting wire (a twist pitch/an outer diameter of the conducting wire) is 10.8 or less.

The insulator is made of a resin composition containing a vinyl chloride resin and having an elongation rate of 130% or higher at −40° C.

An adhesion strength between the conducting wire and the insulator is 20 N or less.

A wire harness according to a second aspect of the present invention includes the highly bendable insulated electric wire of the first aspect.

DETAILED DESCRIPTION OF THE INVENTION

Figure 1:
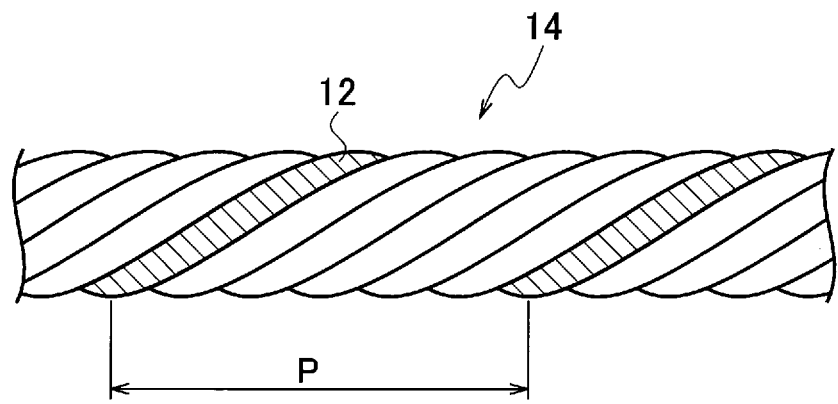
FIG. 1 is a conceptual diagram for describing a twist pitch of a conducting wire.
Figure 2:
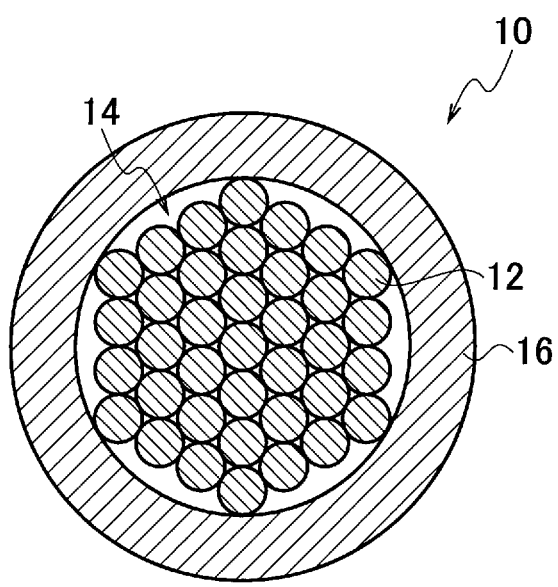
FIG. 2 is a cross-sectional view of a highly bendable insulated electric wire according to present embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for an embodiment of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

<Highly Bendable Insulated Electric Wire>

A highly bendable insulated electric wire according to present embodiment includes a conducting wire formed by stranding a plurality of metal strands and an insulator covering the conducting wire. Further, a twist pitch ratio of the conducting wire (a twist pitch/an outer diameter of the conducting wire) is 10.8 or less, the insulator is made of a resin composition containing a vinyl chloride resin and having an elongation rate of 130% or higher at −40° C., and an adhesion strength between the conducting wire and the insulator is 20 N or less. As the conducting wire and the insulator satisfy the above-described conditions, the highly bendable insulated electric wire of present embodiment is excellent in flexibility under environment of both normal temperature (about 23° C.) and low temperature (about −30° C.) without requiring a special structure or an additional member. More specifically, by setting the twist pitch ratio of the conducting wire to 10.8 or less, flexure distortion that is applied to the strand is reduced. In addition, interference between the metal strand and the insulator is reduced by setting the adhesion strength between the conducting wire and the insulator to 20 N or less. In addition to the above-described condition, when an insulator having elongation performance of 130% or higher under low-temperature environment at −40° C. is used, the highly bendable insulated electric wire is excellent in flexibility under environment of both the normal temperature and low temperature.

Hereinafter, the conducting wire and the insulator in the highly bendable insulated electric wire of present embodiment will be described.

[Conducting Wire]

The conducting wire is formed by stranding the plurality of metal strands. The metal strand is not particularly limited regarding a material of the conducting wire and can be appropriately determined depending on applications. A known conductive metal material such as copper, a copper alloy, aluminum, and an aluminum alloy can be used as a material of the metal strand.

In present embodiment, the twist pitch ratio of the conducting wire (the twist pitch/the outer diameter of the conducting wire) is 10.8 or less. When the twist pitch ratio is 10.8 or less, flexure distortion applied to the metal strand can be reduced. On the contrary, when the twist pitch ratio exceeds 10.8, stress applied to the strand increases, the flexure distortion increases, and the flexibility is likely to decrease. The twist pitch ratio of the conducting wire is preferably 8.6 or less. In addition, a lower limit of the twist pitch ratio of the conducting wire is preferably 5.0.

As illustrated in FIG. 1, the "twist pitch" means a length P of a conducting wire 14 in a longitudinal direction that corresponds to one turn of a single metal strand 12 spirally making a rotation in the conducting wire 14. In addition, the "outer diameter" means a circle-equivalent diameter of a cross section perpendicular to the longitudinal direction of the conducting wire.

In present embodiment, the twist pitch of the conducting wire is preferably set such that the twist pitch ratio is 10.8 or less, and can be set to, for example, 8 to 25 mm. Similarly, the outer diameter of the conducting wire can be set to 0.8 to 2.4 mm.

In present embodiment, a diameter of the strand of the metal strand is not particularly limited as long as the twist pitch ratio of the conducting wire satisfies the above-described range, and can be set to, for example, 0.16 to 0.32 mm. In addition, a size of the conducting wire can be set to 0.35 to 3 sq.

There is no particular limitation on a method of stranding the plurality of metal strands to obtain the conducting wire, and the metal strands may be manually stranded or be stranded using an automatic machine. In either case, the twist pitch ratio of the conducting wire is set to be 10.8 or less.

[Insulator]

In present embodiment, the insulator covering the conducting wire is made of a resin composition containing a vinyl chloride resin and having an elongation rate of 130% or higher at −40° C. Since the insulator has the elongation performance as described above in the low-temperature environment, it is possible to provide an insulated electric wire having high normal-temperature flexibility and low-temperature flexibility.

Here, the "elongation rate" can be measured according to JIS K 7161 (Plastics-Test Method of Tensile Properties-Part 1: General Rule).

In order to make the elongation rate at −40° C. of the resin composition forming the insulator to be 130% or higher, for example, a specific vinyl chloride resin is selected or specific additives such as a plasticizer and a flexible resin is added.

Examples of the vinyl chloride resin used in the resin composition of present embodiment can include polyvinyl chloride, chlorinated polyvinyl chloride, polyvinylidene chloride, chlorinated polyethylene, a vinyl chloride-vinyl acetate copolymer, a vinyl chloride-ethylene copolymer, a vinyl chloride-propylene copolymer, a vinyl chloride-styrene copolymer, a vinyl chloride-isobutylene copolymer, a vinyl chloride-vinylidene chloride copolymer, a vinyl chloride-styrene-maleic anhydride copolymer, a vinyl chloride-styrene-acrylonitrile copolymer, a vinyl chloride-butadiene copolymer, a vinyl chloride-isoprene copolymer, vinyl chloride-chlorinated propylene copolymer, a vinyl chloride-vinylidene chloride-vinyl acetate copolymer, a vinyl chloride-maleic acid ester copolymer, a vinyl chloride-methacrylic acid ester copolymer, a vinyl chloride-acrylonitrile copolymer, and a vinyl chloride-various vinyl ether copolymer. One kind of these vinyl chloride resins may be used alone, or two or more kinds thereof may be used in combination. Incidentally, a method of polymerizing the vinyl chloride resins is not particularly limited, and may be bulk polymerization, solution polymerization, suspension polymerization, emulsion polymerization, and the like.

An average polymerization degree (weight average polymerization degree) of the vinyl chloride resin is not particularly limited, but is preferably 500 to 5000, and more preferably 1000 to 3000. When the average polymerization degree is 500 or more, it is possible to suppress a decrease in wear resistance of the resin composition thus obtained. In addition, when the average polymerization degree is 5000 or less, it is possible to suppress an increase in melt viscosity at the time of extrusion molding in the case of extrusion-molding the resin composition and to prevent deterioration of kneading and molding processability. Incidentally, one or a combination of two or more kinds of vinyl chloride resins within the above-described range of the polymerization degree may be used in the resin composition of present embodiment.

The plasticizer used in the resin composition is not particularly limited as long as the plasticizer penetrates between molecules of the vinyl chloride resin to weaken an intermolecular force of the resin and gives flexibility to the vinyl chloride resin. Examples of the plasticizer can include a trimellitic acid type plasticizer and a pyromellitic acid type plasticizer, a phthalic acid type plasticizer, and an aliphatic type plasticizer. Among them, the phthalic acid type plasticizer is preferable from a viewpoint of low cost, excellent flexibility, and an application to electric wires for vehicles.

Examples of the trimellitic acid type plasticizer can include a trimellitic acid ester. Examples of the pyromellitic acid type plasticizer can include a pyromellitic acid ester. Incidentally, examples of alcohols constituting the ester by dehydration condensation in the trimellitic acid ester and the pyromellitic acid ester can include a saturated aliphatic alcohol having 8 to 13 carbon atoms. One kind of these alcohols may be used alone, or two or more kinds thereof may be used in combination.

Examples of the phthalic acid type plasticizer can include a phthalic acid ester. Incidentally, examples of alcohols constituting the ester by dehydration condensation in the phthalic acid ester can include a saturated aliphatic alcohol having 8 to 13 carbon atoms. In addition, one kind of these alcohols may be used alone, or two or more kinds thereof may be used in combination. More specifically, examples of the phthalic acid type plasticizer can include at least one selected from the group consisting of diundecyl phthalate, di-2-ethylhexyl phthalate, di-n-octyl phthalate, diisononyl phthalate, dinonyl phthalate, diisodecyl phthalate, and ditridecyl phthalate.

Examples of the aliphatic type plasticizer can include at least one selected from the group consisting of an adipic acid ester, a sebacic acid ester, and an azelaic acid ester. In addition, examples of alcohols constituting the ester by dehydration condensation in these esters can include a saturated aliphatic alcohol having 3 to 13 carbon atoms. In addition, one kind of these alcohols may be used alone, or two or more kinds thereof may be used in combination. More specifically, examples of the aliphatic type plasticizer can include at least one selected from the group consisting of dioctyl adipate, isononyl adipate, dibutyl sebacate, dioctyl sebacate, and dioctyl azelate.

In the resin composition, a content of the plasticizer with respect to 100 parts by mass of the vinyl chloride resin is preferably 35 to 55 parts by mass. When the content of the plasticizer is within this range, the elongation rate of the insulator can be made 130% or higher. In addition, it is possible to improve the cold resistance while suppressing deformation at high temperature.

As the flexible resin, one or more kinds among chlorinated polyolefin such as chlorinated polyethylene, acrylic rubber, and acrylic or styrene elastomer can be used. As the acrylic rubber, nitrile rubber (NBR) or the like can be used. As the elastomer, an ethylene vinyl acetate copolymer (EVA), ethylene ethyl acrylate (EEA), ethylene methyl acrylate (EMA), or the like can be used. Among them, chlorinated polyethylene is preferably used. A content of the flexible resin is preferably 2 to 20 parts by mass, and more preferably 5 to 10 parts by mass with respect to 100 parts by mass of the vinyl chloride resin from a viewpoint of achieving the elongation rate of the insulator of 130% or more.

In present embodiment, other additives can be added to the resin composition forming the insulator, if necessary, within a range of not hindering the effects of present embodiment. Examples of the additives include a flame retardant aid, an antioxidant, a metal deactivator, an anti-aging agent, a filler, a reinforcing agent, an ultraviolet absorber, a stabilizer, a pigment, a dye, a colorant, an antistatic agent, and a foaming agent.

In present embodiment, a thickness of the insulator is preferably 0.20 to 0.40 mm, and more preferably 0.25 to 0.35 mm.

[Adhesion Strength Between Conducting Wire and Insulator]

In present embodiment, the adhesion strength between the conducting wire and the insulator is 20 N or less. When the adhesion strength between the conducting wire and the insulator is 20 N or less, interference between the conducting wire and the insulator can be reduced. The adhesion strength is preferably 15 N or less. In addition, a lower limit of the adhesion strength is preferably 10 N.

Here, the "adhesion strength" is obtained by measurement according to JASO D 618 "Test Method for Automobile Parts and Low-Voltage Electric Wire".

Examples of methods for setting the adhesion strength between the conducting wire and the insulator to 20 N or less include the following methods. (1) During manufacture of the electric wire in insulator coating, the conducting wire is not subjected to preheating or is subjected to preheating at low temperature before coating the insulator. (2) The pressure at the time of coating the insulator resin is reduced. (3) The insulator is extrusion-molded into a tubular shape. (4) The conducting wire is coated with a lubricant.

Although the insulator and the conducting wire have been described as above, the highly bendable insulated electric wire of present embodiment can be manufactured by coating the above-described conducting wire with the insulator made of the above-described resin composition. Hereinafter, a method of manufacturing the highly bendable insulated electric wire of present embodiment will be described. The insulator of the highly bendable insulated electric wire is prepared by kneading the above-described material, and a known method can be used for this method. For example, the resin composition forming the insulator can be obtained by performing pre-blending using a high-speed mixer such as a Henschel mixer, and then, kneading using a known kneading machine such as a Banbury mixer, a kneader, and a roll mill.

In addition, a known method can be used also for the method of coating the conducting wire with the insulator. For example, the insulator can be formed by a general extrusion molding method. As an extruder used in the extrusion molding method, for example, a single-screw extruder or a twin-screw extruder, which has a screw, a breaker plate, a crosshead, a distributor, a nipple, and dies, can be used.

When preparing the resin composition forming the insulator, a resin material is charged into the twin-screw extruder set at temperature at which the resin material is sufficiently melted. At this time, other components such as a lubricant, a flame retardant aid and an antioxidant are also added if necessary. Then, the resin material is melted and kneaded by the screw, and a certain amount thereof is supplied to the crosshead via the breaker plate. The melted resin material or the like flows onto the circumference of the nipple by the distributor, and is extruded in the state of covering the outer periphery of the conducting wire by the dies, whereby it is possible to obtain the insulator covering the outer periphery of the conducting wire, that is, the highly bendable insulated electric wire.

<Wire Harness>

A wire harness of present embodiment includes the highly bendable insulated electric wire described above. The wire harness of present embodiment includes the highly bendable insulated electric wire of the above-described embodiment, and thus, can be suitably used as a wire harness excellent in flexibility under environment of both normal temperature and low temperature.

Hereinafter, the present invention will be described in more detail with reference to examples and comparative examples, but the present invention is not limited to these examples.

Examples 1 and 2 and Comparative Examples 1 to 3

Incidentally, in each example and comparative example, an insulator composition obtained by melt-kneading the following resin composition 1 was extrusion-molded to cover a conducting wire, thereby obtaining a highly bendable insulated electric wire. In the respective examples and the comparative examples, conducting wires obtained by stranding metal strands made of copper and having strand diameters described in Table 1 so as to have twist pitch ratios described in Table 1 were used. In addition, preheating temperature of the conducting wire was adjusted such that adhesion strength between the conducting wire and the insulator is adjusted to be the numerical values described in Table 1. The adhesion strength was measured according to JASO D 618 "Test Method for Automobile Parts and Low-Voltage Electric Wire".

(Formulation of Resin Composition 1)
Polyvinyl chloride (polymerization degree: 1300): 100% by mass
Chlorinated polyethylene (flexible resin): 10% by mass
Diundecyl phthalate (plasticizer): 35% by mass
Stabilizer for Ca/Zn-type PVC (stabilizer): 5% by mass Comparative Example 4

A highly bendable insulated electric wire was prepared in a similar manner to Example 1 except that a resin composition forming an insulating layer was changed to the following resin composition 2.
(Formulation of Resin Composition 2)
Polyvinyl chloride (polymerization degree: 1300): 100% by mass
Diundecyl phthalate (plasticizer): 35% by mass
Stabilizer for Ca/Zn-type PVC (stabilizer): 5% by mass In the respective examples and comparative examples, an elongation rate of the insulator at −40° C. was measured in accordance with JIS K 7161.

Figure 3:
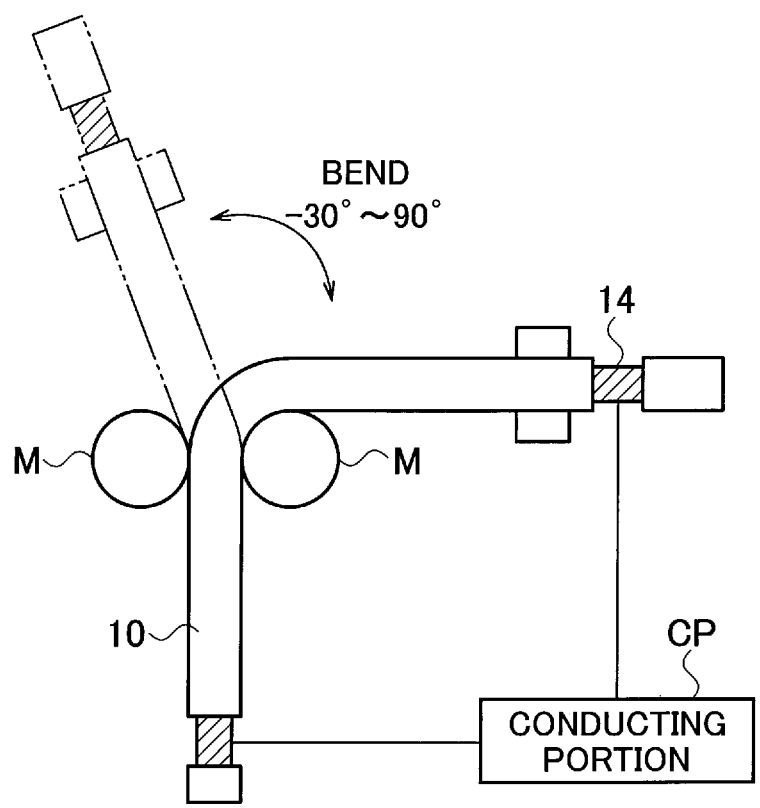
FIG. 3 is a diagram schematically illustrating a device used for a flexure test.

Next, the following evaluation test was conducted with respect to the prepared highly bendable insulated electric wire using a flexure test device illustrated in FIG. 3.

(1) Normal-Temperature Flexure Test

Using a test device illustrated in FIG. 3, first, the vicinity of one end and the vicinity of the other end of a highly bendable insulated electric wire 10 of each embodiment and comparative example were electrically connected to a conducting portion CP. Next, an operation of bending the highly bendable insulated electric wire 10 from a straightly-elongated state to have a bending radius of 25 mm of a mandrel M in an angle range between −30° (in the left direction in FIG. 3) and 90° (in the right direction in FIG. 3) was repeatedly performed. Then, disconnection of a metal strand of a conducting wire was detected by the conducting portion CP, and the number of times of the detected disconnection was measured. Test temperature was set to normal temperature (23° C.), and bending speed applied to a test piece was set to 60 rpm. In addition, the test was conducted without placing a load such as weight on a sample in consideration of the case of being assembled to a vehicle. It was evaluated as "X" for the number of times of flexure of 59999 or less, "○" for the number of times of flexure of 60000 times or more, and "⊙" for the number of times of flexure of 80000 times or more. Results of the evaluation are illustrated in Table 1.

(2) Low-Temperature Flexure Test

The test was conducted in a similar manner to the normal-temperature flexure test of (1) described above except that the test temperature was set to −30° C. Then, it was evaluated as "X" for the number of times of flexure of 6999 or less, "Δ" for the number of times of flexure of 7000 to 9999 times, "○" for the number of times of flexure of 10000 times or more, and "⊙" for the number of times of flexure of 15000 times or more. Results of the evaluation are illustrated in Table 1.

TABLE 1

| ITEM | UNIT | EXAMPLE 1 | EXAMPLE 2 | COMPARATIVE EXAMPLE 1 | COMPARATIVE EXAMPLE 2 | COMPARATIVE EXAMPLE 3 | COMPARATIVE EXAMPLE 4 |
|---|---|---|---|---|---|---|---|
| SIZE OF CONDUCTING WIRE | — | 2 sq | 2 sq | 2 sq | 2 sq | 2 sq | 2 sq |
| STRAND DIAMETER | mm | 0.26 | 0.26 | 0.26 | 0.26 | 0.26 | 0.26 |
| OUTER DIAMETER OF CONDUCTING WIRE (A) | mm | 1.85 | 1.85 | 1.85 | 1.85 | 1.85 | 1.85 |
| TWIST PITCH OF CONDUCTING WIRE (B) | mm | 20 | 20 | 30 | 30 | 20 | 20 |
| TWIST PITCH RATIO (B/A) | — | 10.8 | 10.8 | 16.2 | 16.2 | 10.8 | 10.8 |
| ADHESION STRENGTH | Mpa | 10 | 20 | 35 | 20 | 35 | 35 |
| ELONGATION OF INSULATOR AT −40° C. | % | 130 | 130 | 130 | 130 | 130 | 50 |
| THE NUMBER OF TIMES OF FLEXURE AT NORMAL TEMPERATURE | — | ⊙ | ○ | X | Δ | Δ | X |
| THE NUMBER OF TIMES OF FLEXURE AT LOW TEMPERATURE | — | ⊙ | ⊙ | Δ | ○ | ○ | X |

Based on Table 1, it is understood that the highly bendable insulated electric wires of Examples 1 and 2 are excellent in flexibility at both normal temperature and low temperature. On the other hand, the flexibility at either normal temperature or low temperature was inferior in Comparative Examples 1 to 4.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:
1. A highly bendable insulated electric wire comprising:
a conducting wire formed by stranding a plurality of metal strands; and
an insulator covering the conducting wire,
wherein a twist pitch ratio of the conducting wire (a twist pitch/an outer diameter of the conducting wire) is 10.8 or less,
the insulator is made of a resin composition containing a vinyl chloride resin and having an elongation rate of 130% or higher at −40° C., and
an adhesion strength between the conducting wire and the insulator is 20 N or less.

2. A wire harness comprising the highly bendable insulated electric wire according to claim 1.

3. The electric wire of claim 1, wherein the resin composition comprises a plasticizer penetrated between molecules of the vinyl chloride resin and at 35 to 55 parts by mass of 100 parts by mass of the vinyl chloride resin.

* * * * *